(12) United States Patent
Baldsiefen et al.

(10) Patent No.: US 11,950,540 B2
(45) Date of Patent: Apr. 9, 2024

(54) TWINE KNOTTER AND METHOD OF FORMING TWO KNOTS IN A TWINE

(71) Applicant: Rasspe Systemtechnik Gmbh, Wermelskirchen (DE)

(72) Inventors: Karsten Baldsiefen, Lindlar (DE); Felix Höller, Lindlar (DE); Bartlomiej Mateusz König, Remscheid (DE); Andreas Acimas, Solingen (DE); Michael Flanhardt, Langefeld (DE)

(73) Assignee: Rasspe Systemtechnik Gmbh, Wermelskirchen (DE)

( * ) Notice: Subject to any disclaimer, the term of this patent is extended or adjusted under 35 U.S.C. 154(b) by 166 days.

(21) Appl. No.: 17/590,913

(22) Filed: Feb. 2, 2022

(65) Prior Publication Data

US 2022/0240454 A1    Aug. 4, 2022

(30) Foreign Application Priority Data

Feb. 4, 2021    (EP) ...................................... 21155180

(51) Int. Cl.
*A01F 15/14*    (2006.01)
(52) U.S. Cl.
CPC .................................. *A01F 15/145* (2013.01)
(58) Field of Classification Search
CPC ............................... A01F 15/14; A01F 15/145
See application file for complete search history.

(56) References Cited

U.S. PATENT DOCUMENTS

| | | | | |
|---|---|---|---|---|
| 4,074,623 | A * | 2/1978 | White | A01F 15/145 100/31 |
| 7,343,851 | B2 * | 3/2008 | Schumacher | A01F 15/145 140/101 |
| 9,832,932 | B2 * | 12/2017 | Schumacher | A01F 15/0858 |
| 9,883,633 | B2 * | 2/2018 | Demon | A01F 15/145 |
| 10,945,379 | B2 * | 3/2021 | Naeyaert | A01F 15/145 |
| 10,986,784 | B2 * | 4/2021 | Maelfeyt | A01F 15/145 |
| 11,528,849 | B2 * | 12/2022 | Acimas | A01D 59/04 |
| 2006/0012176 | A1 * | 1/2006 | Schoonheere | A01F 15/145 289/2 |
| 2009/0044710 | A1 * | 2/2009 | Eylenbosch | A01F 15/145 100/19 R |
| 2014/0103647 | A1 * | 4/2014 | Schoonheere | A01F 15/145 289/1.5 |

(Continued)

FOREIGN PATENT DOCUMENTS

DE    203 17 302 U1    3/2005
EP         1745691 B1    1/2009

*Primary Examiner* — Bao-Thieu L Nguyen
(74) *Attorney, Agent, or Firm* — Sughrue Mion, PLLC (57) ABSTRACT

A twine knotter (10) for forming two knots (16, 33) in a pair of twine strands comprising: a drive pulley (20), a bill hook (9) rotatably driven by the drive pulley (20) about a knotter axis (K) to form two successive knots (16, 33) in the pair of twine strands (5, 7), a twine holding device (18) for clamping the pair of twine strands (5, 7) between a first clamping element (21) and a second clamping element (22), and a twine knife (13) for cutting the pair of twine strands (5, 7). The second clamping element is driven rotatably about a twine holder axis (G) by the drive pulley such that the rotatable second clamping element completes two rotations for one rotation of the drive pulley, and the twine holder axis (G) and the knotter axis (K) enclose an angle of less than 45° with one another.

16 Claims, 9 Drawing Sheets

(56) References Cited

U.S. PATENT DOCUMENTS

| | | | |
|---|---|---|---|
| 2015/0097370 A1* | 4/2015 | Schumacher | A01F 15/145 |
| | | | 289/1.5 |
| 2015/0272011 A1 | 10/2015 | Demon | |
| 2019/0335671 A1* | 11/2019 | Maelfeyt | A01F 15/145 |
| 2020/0137960 A1* | 5/2020 | Naeyaert | A01F 15/04 |
| 2020/0178471 A1* | 6/2020 | Brown, Jr. | A01F 15/12 |
| 2021/0000018 A1* | 1/2021 | Acimas | A01D 59/04 |

* cited by examiner

TWINE KNOTTER AND METHOD OF FORMING TWO KNOTS IN A TWINE

BACKGROUND OF THE INVENTION

Field of the Invention

The disclosure relates to a twine knotter for forming two knots in a pair of twine strands, the twine knotter comprising a drive pulley driven intermittently rotatably about a drive axis and a bill hook rotatably driven by the drive pulley about a knotter axis to form two successive knots in the pair of twine strands by two complete rotations of the bill hook in one rotation of the drive pulley. Further, the twine knotter comprises a twine holding device for clamping the pair of twine strands between a first clamping element and a second clamping element of the twine holding device rotatably driven by the drive pulley, and a twine knife for severing the pair of twine strands.

Background

Twine knotters or tying machines are mainly used in mobile packing presses for the formation of bundles of straw, hay, silage and similar materials as well as in the use of recyclable materials, for example for bundling paper, textiles, thin sheet metal and the like. Binding or bundling equipment fitted with such twine knotters may also form part of packaging machinery for strapping packages, bales or bundles of other materials suitable for this purpose.

In stationary or mobile pack presses, the material to be pressed is compacted in a pressing channel, which is usually rectangular in cross-section, and pressed into a rectangular material strand. The material strand is divided into cuboidal packs—the term square bales is also commonly used—whose top and bottom sides and their outer sides are strapped with several twine strands in the longitudinal direction of the baling channel, which are knotted before the pack is ejected.

EP 1 745 691 B1 discloses several twine knotters driven together by one knotter shaft. Each twine knotter has a drive disk which is mounted on the knotter shaft and is connected to it in a rotationally fixed manner. The drive pulley has a plurality of toothing sections over partial circumferences that mesh with pinions of drive components, such as the bill hook and the rotatable clamping element of the twine holding device, to rotationally drive them. The toothing sections are combined into two groups of toothing sections that each serve to form one of the two knots. The toothing sections of one group are arranged on different diameters and offset to each other over the circumference. The pinions of the drive components are also offset from each other over the circumference and arranged on the diameter of the respective toothing section. The toothing sections for driving the twine holding device are arranged in such a way in the direction of rotation of the drive pulley leading to the toothing sections driving the bill hook that when a knot is formed the twine holding device starts to rotate before the bill hook.

With this arrangement, two knots can be tied in one full rotation of the drive pulley. Twine holding devices with a driver and a twine holder are used. The driver is made of several driver discs arranged at a distance from each other, between which a comb-like twine holder engages. The driver is driven in rotation about a driver axis, which is aligned approximately in the direction in which the twine is fed to the knotter. The twine is then clamped between the driver and the twine holder.

A disadvantage of the described state-of-the-art twine knotter is that a twine waste is created between the formation of two knots, which twine residue is not knotted to the pair of twine strands at the bundle and falls loosely onto the bundle as waste.

SUMMARY OF THE INVENTION

One aspect of the present disclosure is to provide a twine knotter and a method for forming knots by avoiding twine waste.

Therefore, the twine knotter comprising a drive pulley driven intermittently rotatably about a drive axis and a bill hook rotatably driven by the drive pulley about a knotter axis to form two successive knots in the pair of twine strands by two complete rotations of the bill hook in one rotation of the drive pulley. Further, the twine knotter comprises a twine holding device for clamping the pair of twine strands between a first clamping element and a second clamping element of the twine holding device rotatably driven by the drive pulley, and a twine knife for severing the pair of twine strands. The rotatable second clamping element of the twine holding device is driven rotatably about a twine holder axis by the drive pulley in such a way that the rotatable second clamping element completes two rotations for one rotation of the drive pulley. Further, the twine holder axis and the knotter axis form an angle of less than 45° with each other when viewed in the direction of the drive axis.

In this twine knotter in the form of a double knotter, in which two knots are tied in one full rotation of the drive pulley, a rotatable second clamping element of the twine holding device is used, which, in contrast to known twine knotters, is driven rotatably about a twine holder axis which encloses an angle of less than 45° with the knotter axis. The twine holder axis is arranged transversely to the feed direction of the pair of twine strands. In this design of twine knotter, in which the rotatable second clamping element of the twine holding device completes two full rotations for one full rotation of the drive pulley, the twine knife pulls the pair of twine strands out of the twine holding device after the formation of the second knot without severing them. This is achieved by fully rotating the rotatable second clamping element at the time when the twine knife reaches the pair of twine strands after forming the second knot. Because then the pair of twine strands is no longer clamped in the twine holding device and can be pulled out of the twine holding device by the twine knife.

Another advantage is that the bill hook is rotationally driven in the same direction for both knots, so that both knots are knotted in the same direction. Preferably, a twisted twine is used, which is, at the predetermined direction of rotation of the bill hook, slightly untwisted against the twisting direction of the twine. The fact that there is no twine waste during knot formation means that a longer twine end is available when the loop is pulled off over the bill hook for forming the knot. This allows two loop knots to be tied one after the other, which are stronger than pulled-through knots.

In this arrangement, in an exemplary embodiment of the twine knotter, the twine holder axis and the knotter axis may form an angle of less than 40° with each other, in particular less than 35°, when viewed in the direction of the drive axis.

Further, in an exemplary embodiment of the twine knotter, the twine holder axis and the knotter axis may include an angle of more than 15° with each other, particularly more than 20°, when viewed in the direction of the drive axis.

The twine holder axis may intersect or cross the drive axis at a distance, which is less than an outside diameter of the drive pulley.

According to an exemplary embodiment, the twine knotter may further comprise a knot pull-off arm, for pulling off a first loop in the pair of twine strands and forming the first knot after a full rotation of the bill hook. Thus, a loop for forming a knot can be actively pulled off the bill hook to ensure a safe formation of a knot.

A twine knife for severing the pair of twine strands may be disposed on the knot pull-off arm, such that during or after the loop is pulled off to form the first knot, the pair of twine strands may be severed.

Alternatively, the twine knife may be disposed on the rotatable second clamping element of the twine holding device so that severing of the pair of twine strands may be performed independently of pulling off the loop to form the first knot.

The first clamping element of the twine holding device can be stationary. The stationary first clamping element and the rotatable second clamping element of the twine holding device each may have a recess, running radially with respect to the twine holder axis, for receiving the pair of twine strands.

The first clamping element and the rotatable second clamping element of the twine holding device may each have clamping surfaces facing each other for clamping the pair of twine strands. The clamping surfaces facing each other in the direction of the twine holder axis can be conical and complementary to each other. The clamping surfaces facing each other can also be flat, for example at a right angle to the twine holder axis.

To drive the second clamping element of the twine holding device, the drive pulley may have two twine holder toothing sections, each extending partially circumferentially about the drive axis and having the same radial distance from the drive axis. To drive the bill hook, the drive pulley may have two bill hook toothing sections, each extending partially circumferentially about the drive axis and having the same radial distance from the drive axis.

When the drive pulley is rotationally driven, at corresponding rotational angle ranges, the twine holder teeth sections come into overlap with a pinion of the second clamping element of the twine holding device to mesh therewith and thereby drive it. On a different radius, in corresponding rotational angle ranges, the bill hook toothing sections come into overlap with a pinion of the bill hook to mesh therewith and drive it.

The twine holder toothing sections and the bill hook toothing sections are divided into groups of one twine holder toothing section and one bill hook toothing section, respectively, to form one of the two knots. In this case, the groups of toothing sections are arranged offset from each other in the circumferential direction so that the second clamping element and the bill hook are each intermittently driven twice in succession during one rotation of the drive pulley to form two knots in succession.

The twine holder toothing sections and the bill hook toothing sections may each be spaced at different distances from the drive axis.

Alternatively, it may be provided that each of the twine holder toothing section and the bill hook toothing section of a group of toothing sections for forming one of the knots is formed by a common toothing section. This means that the twine holder toothing sections and the bill hook toothing sections are arranged at the same distance from the drive axis. Accordingly, the two toothing sections each serve to drive both the second clamping element of the twine holding device and the bill hook. The common toothing sections are offset from each other around the circumference.

A method for forming two knots in a twine by means of a twine knotter described above comprises the following method sequence:

1. Feeding a pair of twine strands by means of a twine feeding device over the bill hook to the twine holding device,
2. Rotating the bill hook one full rotation to form a first loop in the pair of twine strands for a first knot,
3. Rotating said rotatable second clamping element for clamping said pair of twine strands in said twine holding device, wherein said rotating of said rotatable second clamping element starts after at least partial rotation of said bill hook and at least partial formation of said first loop,
4. Cutting the pair of twine strands between the bill hook and the twine holding device after the pair of twine strands has been clamped in the twine holding device,
5. Pulling the first loop off the bill hook to form the first knot,
6. Feeding the pair of twine strands by means of the twine feeding device from the twine holding device over the bill hook,
7. Rotating the bill hook one full turn to form a second loop in the pair of twine strands for a second knot,
8. Rotating said rotatable second clamping element to release said pair of twine strands from said twine holding device, said rotating of said rotatable second clamping element starts after at least partial rotation of said bill hook and at least partial formation of said first loop, and
9. Pulling the second loop off the bill hook to form the second knot.

In that, after at least partial rotation of the bill hook and at least partial formation of the loop for the second knot, the pair of twine strands clamped in the twine holding device is released by rotation of the rotatable clamping element, it is ensured that the twine knife can no longer sever the pair of twine strands. Rather, the pair of twine strands is pulled out of the released twine holding device by the twine knife. In this way, a twine waste is avoided.

Cutting the pair of twine strands after forming the second knot may be accomplished by continuing to rotate the rotatable second clamping element, with the twine knife arranged on the rotatable second clamping element and cutting the pair of twine strands.

Pulling off the first loop to form the first knot, and pulling off the second loop to form the second knot, may be accomplished by moving a knot pull-off arm.

The cutting of the twine pair can also be done by means of a twine knife on the knot pull-off arm when pulling the loop off the bill hook. In this case, no twine knife is arranged on the rotatable second clamping element. Alternatively, the pair of twine strands can be cut by a stationary twine knife on a knotter frame.

In an exemplary embodiment of the method, it may be provided that the first clamping element is stationary and, like the rotatable second clamping element, has a recess extending radially relative to the twine holder axis for receiving the pair of twine strands. To clamp the pair of twine strands after at least partial formation of the first loop, the rotatable second clamping element is rotated to a rotational position in which the recess of the rotatable second clamping element and the recess of the first clamping element are oriented in overlapping relationship with one another. The pair of twine strands is then fed into the recesses of the two clamping elements and finally the rotatable second clamping element is rotated further until the pair of twine strands is clamped between the clamping surfaces of the clamping elements.

After cutting the pair of twine strands, the rotatable second clamping element can be further rotated until the rotational position at the beginning of the rotation is reached and the rotation is paused.

BRIEF DESCRIPTION OF THE DRAWINGS

An exemplary embodiment of a twine knotter is explained in more detail in the following with reference to the figures. Herein

DETAILED DESCRIPTION

Figure 1:
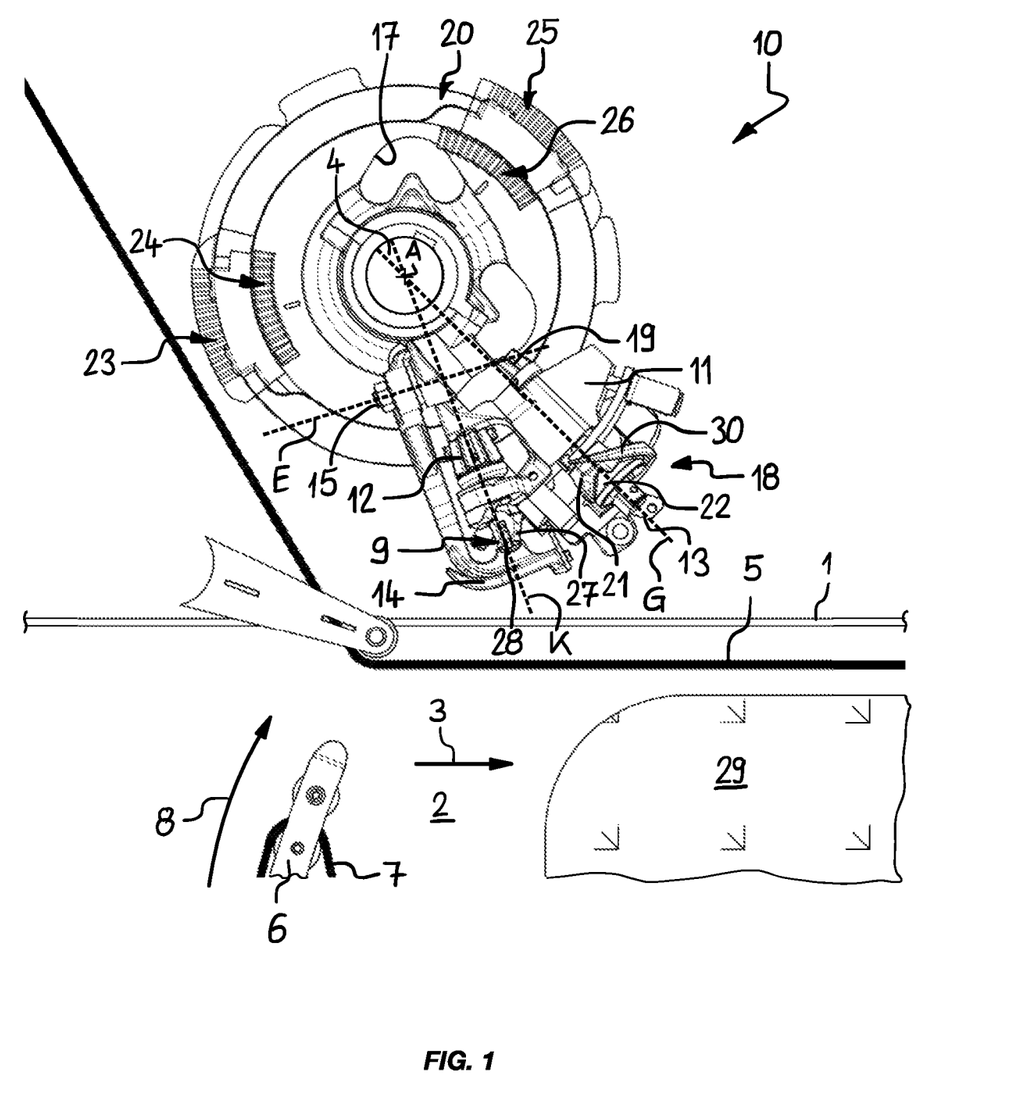
FIG. 1 shows a side view in the direction of the axis of the knotter shaft of a twine knotter attached to a baler to form two knots.

FIG. 1 shows an upper wall 1 of a baling channel 2, through which material to be baled, e.g. straw, is conveyed in conveying direction 3, wherein a bale 29 is formed from baled material. Above the upper wall 1, a knotter shaft 4 extending across the width of the baling channel 2 is mounted rotatably about a drive axis A, on which, depending on the width of baling channel 2, several twine knotters 10 can be arranged. Each twine knotter 10 is associated with a twine loop or strapping made of a first twine strand 5 and a second twine strand 7 laid around the bale 29 in a vertical longitudinal plane at a right angle to the drive axis A, which in the exemplary embodiment of FIG. 1 is closed by forming two knots produced by the twine knotter 10. The first twine strand 5 of the twine, which runs over the top of the bale 29, comes from the front side (not shown), which is located to the right of the twine knotter 10 in the illustration shown in FIG. 1, of the bale 29 in conveying direction 3. The first twine strand 5 is held taut by means not shown in FIG. 1, which are located to the left of twine knotter 10. A strand section is tensioned by means arranged outside the twine knotter 10. A baler needle 6 of a twine feeding device guides a second twine strand 7 of the twine around the rear end face of the bale 29 from below in the direction of arrow 8, so that the second twine strand 7 can be brought together with the first twine strand 5 in the area of the twine knotter 10 to form a pair of twine strands 5, 7 and can be knotted.

The twine knotter 10 comprises a bill hook 9, which is rotatable in a knotter frame 11 about a knotter axis K transversely, preferably radially, to the knotter shaft 4, as shown in FIG. 1 diagonally upwards, and is driven about this knotter axis K via a pinion 12.

A twine knife 13 is movably arranged transversely to the twine strands 5, 7 in order to cut the twine after knot formation.

A knot pull-off arm 14 is pivotally mounted about an axis E of a shaft journal 15 in a bearing in the knotter frame 11 and is thereby moved by a roller, which in FIG. 1 is located behind the shaft journal 15 and is therefore not visible, which is guided in a groove 17 of a drive pulley 20 driven to rotate about the drive axis A. The course of the groove 17, which deviates from a circle, causes the knot pull-off arm 14 to pivot in order to pull off a knot from the bill hook 9.

A twine holding device 18 holds the twine strands 5, 7 in position during certain working phases of the bill hook 9 and the twine knife 13. The twine holding device 18 includes a first clamping element 21 and a rotatable second clamping element 22. In the embodiment shown, the first clamping element 21 is stationary relative to the knotter frame 11. The rotatable second clamping element 22 is rotatable about a twine holder axis G. The twine holder axis G and the knotter axis K, viewed in the direction of the drive axis A, form an angle of approximately 22° with each other. The rotatable second clamping element 22 is supported by a shank 39 in a bearing on the knotter frame 11. The rotatable second clamping element 22 is driven by a pinion 19.

In the case of double knotters according to the exemplary embodiment shown in FIG. 1, two knots are generated per each full rotation of the drive disk 20. Here the pinions 12, 19 are driven by two groups, in the shown exemplary embodiment by pairs, of toothing sections 23, 24 and 25, 26 respectively, which are arranged on the flat side of the drive disk 20 facing the observer in FIG. 1 in the area of its outer edge. The two toothing sections 24, 26 (twine holder toothing sections) for driving the twine holding device 18 are formed identically to each other and have the same radial distance from the drive axis A of the drive pulley 20 so that, when the drive pulley 20 is rotated, they can only engage with the pinion 19 for driving the rotatable second clamping element 22. The two toothing sections 23, 25 (bill hook toothing sections) for driving the bill hook 9 are also formed identically to one another and have the same radial distance from the drive axis A of the drive pulley 20, the toothing sections 23, 25 (bill hook toothing sections) for driving the bill hook 9 being arranged radially further outwards than the toothing sections 24, 26 (twine holder toothed portions) for driving the twine holding device 18. The toothing sections 24, 26 (twine holder toothing sections) for driving the twine holding device 18 are arranged to drive only the pinion 12 for driving the bill hook 9.

Figure 11:
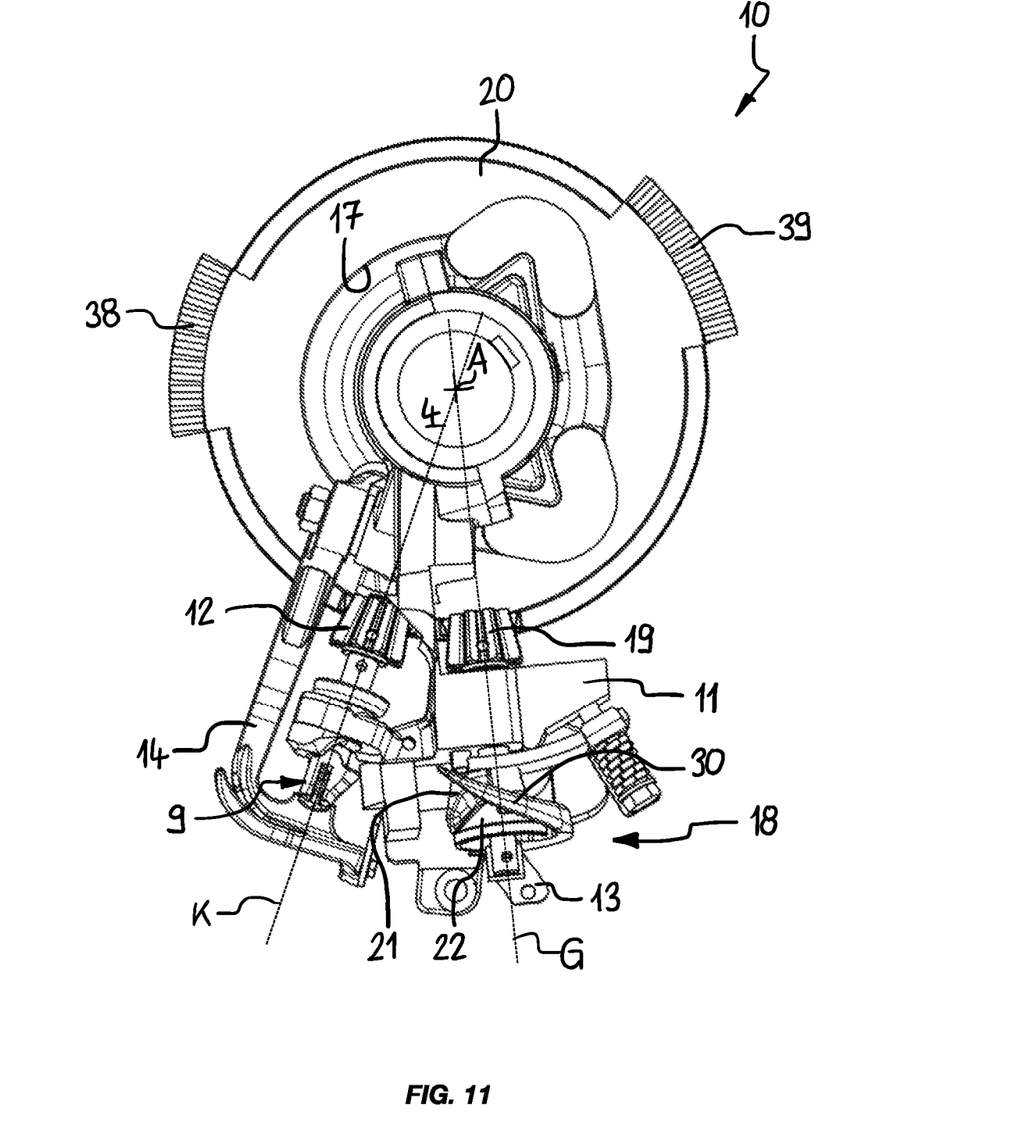
FIG. 11 shows a side view in the direction of the axis of the knotter shaft of a twine knotter attached to a baler to form two knots in an alternative embodiment.

FIG. 11 shows an alternative embodiment of the toothing sections, wherein components which correspond to components of the exemplary embodiment according to FIGS. 1 to 7 are provided with the same reference signs. According to the alternative embodiment, the pinions 12, 19 are driven by two individual toothing sections 38, 39 having the same distance from the drive axis A. The twine holder toothing section and the bill hook toothing section of each group are formed by a single common toothing section 38, 39. In other words, each single common toothing section thus replaces a group of toothing sections 24, 25, 26, 27 according to the embodiment shown in FIGS. 1 to 7. Each individual toothing section here meshes both with the pinion 19 for driving the rotatable second clamping element 22 and with the pinion 12 for driving the bill hook 9. This is particularly possible because, as will be explained in more detail below, when a knot is formed, the bill hook 9 is the first to start rotating and then the rotatable second clamping element 22 starts rotating. The pinion 19 for driving the rotatable second clamping element 22 and the pinion 12 for driving the bill hook 9 are arranged at the same distance from the drive axis A.

The twine knotter 10 shown in FIG. 1 makes two knots one after the other during one rotation of the drive pulley 20. A first knot connects the lower second twine strand 7 coming up behind the rear end of the bale 29 with the upper first twine strand 5, forming a closed twine loop which wraps around the bale 29. A second knot connects the twine strand coming up the front face of the subsequent bale with the twine strand running on the top face of the subsequent bale, forming a new twine loop for the new bale to be formed, into which the bale is pressed. Between the knots the twine is cut off so that the successive bales are separated.

The bill hook has a bill hook jaw formed by a hooked portion 27 and a bill hook tongue 28. The bill hook tongue 28 forms a two-armed lever which can be pivoted about a pivot axis and one arm of which (tongue part) cooperates with the hooked portion 27 of the bill hook 9 to form the bill hook jaw and on the other arm of which a tongue roller (not shown here) is rotatably mounted.

Opening of the bill hook jaw is achieved by the fact that during the rotation of the bill hook 9 the tongue roller runs over a cam surface (not shown here), whereby the tongue roller is lifted and the tongue section is lifted from the hooked area 27.

FIGS. 2 to 7 illustrate the process for forming two knots 16, 33 in a twine by means of the twine knotter 10 as shown in FIG. 1.

Figure 2:
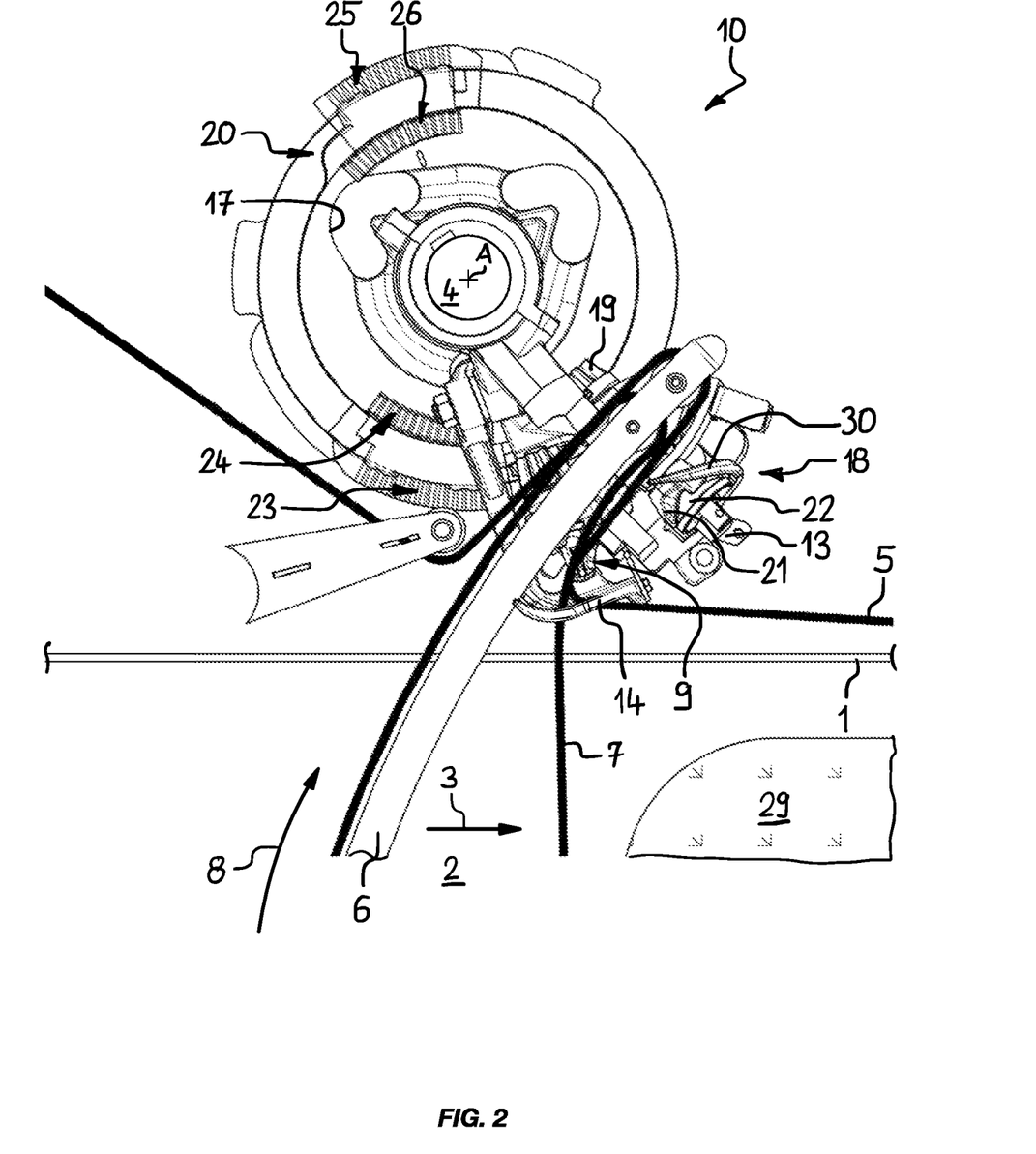
FIG. 2 shows the twine knotter according to FIG. 1 with the bill hook and the twine holding device in an initial position when the pair of twine strands is fed by means of the baler needle.

First, a pair of twine strands, consisting of the first twine strand 5 and the second twine strand 7, is laid over the hooked portion 27 and over the bill hook tongue 28 of the bill hook 9 in the direction of the twine holding device 18 by means of a baler needle 6 of a twine feeding device, as can be seen in particular in FIG. 2. In the position shown in FIG. 2, the bill hook 9 is in an initial position in which the hooked portion 27 of the bill hook 9 is arranged at least approximately parallel to the drive axis A of the knotter shaft 4. Furthermore, the twine holding device 18, in particular the rotatable second clamping element 22 is in an initial position with respect to the stationary first clamping element 21

Figure 3:
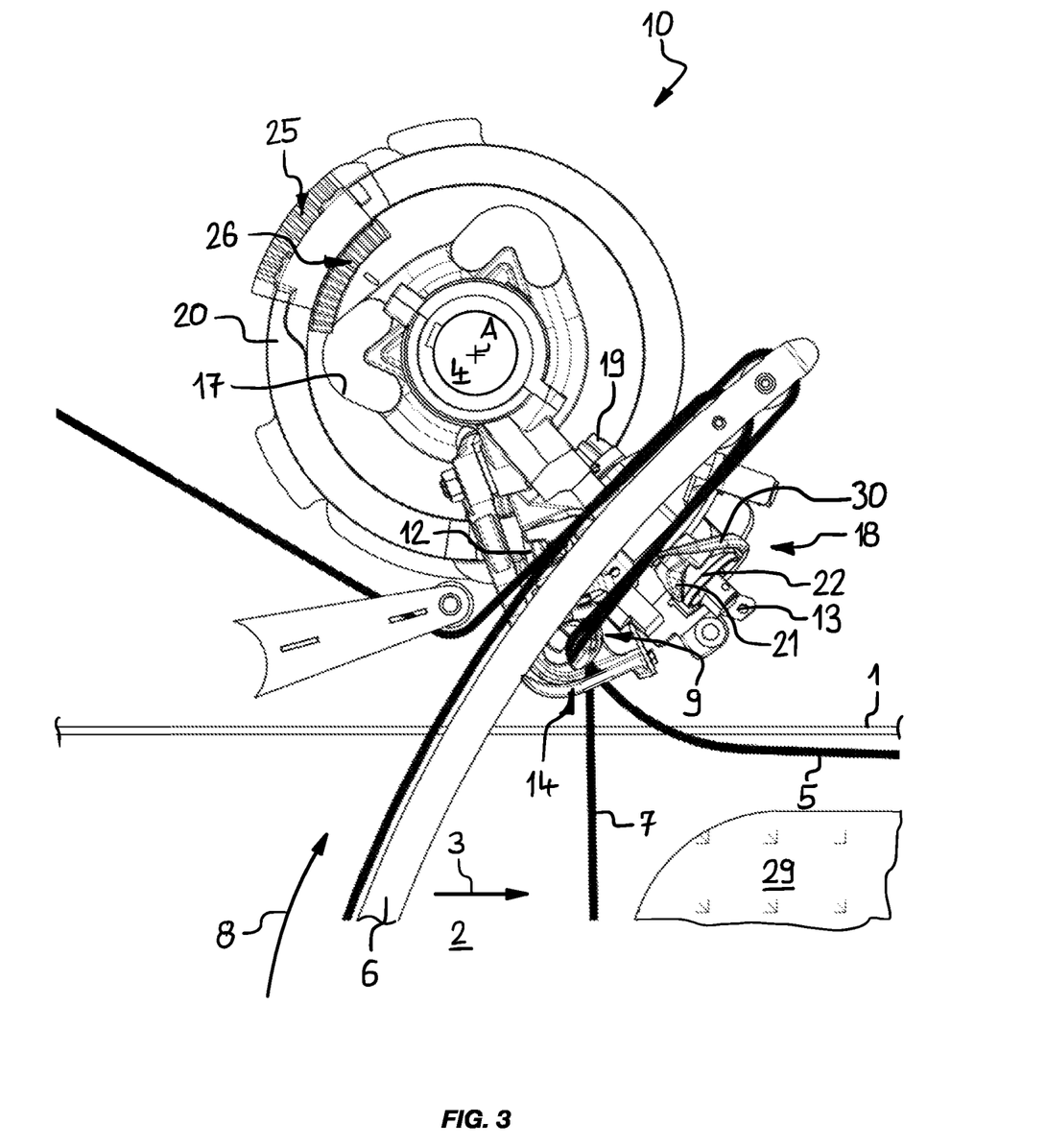
FIG. 3 shows the twine knotter according to FIG. 1 with the bill hook in an intermediate position and the twine holding device in an initial position after feeding the pair of twine strands.

The bill hook is then rotated about the knotter axis K in a direction in which the hooked portion 27 of the bill hook 9 initially moves away from the twine holding device 18, forming a first loop to form a first knot 16 in the pair of twine strands 5, 7 around the bill hook 9 as shown in FIG. 3. The pair of twine strands 5, 7 fed by the baler needle 6 is already in the catching region of a catching arm 30 of the twine holding device, which arm is fastened to the rotatable second clamping element 22 and forms a circumferential catching region in the circumferential direction about the twine holder axis G, in which catching region the pair of twine strands 5, 7 can be received.

Thereupon, the rotatable second clamping element 22 is started to rotate about the twine holder axis G relative to the fixed first clamping element 21. As a result, the pair of twine strands 5, 7 are held in the area between the catching arm 30 and the rotating second clamping element 22 and inserted into radial recesses 31, 32 on the stationary first clamping element 21 and on the rotating second clamping element 22. By further rotating the rotatable second clamping element 22, the pair of twine strands 5, 7 is then clamped between two clamping surfaces 34, 35 facing each other on the stationary first clamping element 21 and the rotatable second clamping element 22.

Figure 8:
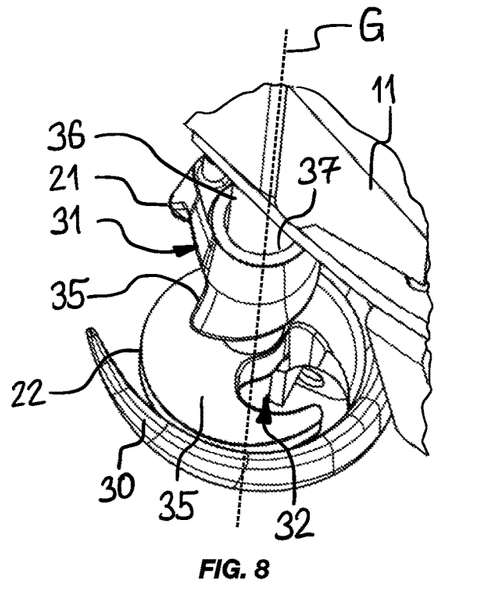
FIG. 8 shows a perspective view of the twine holding device.
Figure 9:
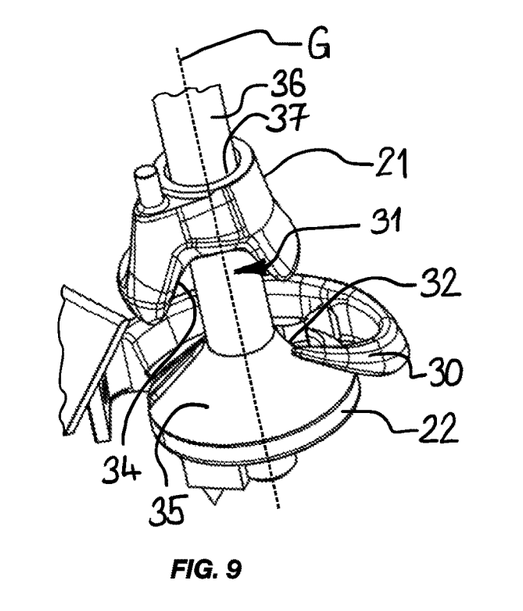
FIG. 9 shows another perspective view of the twine holding device.

The radial recesses 31, 32 can be seen in particular in FIGS. 8 and 9. FIGS. 8 and 9 show the twine holding device 18 in a perspective view, wherein the stationary first clamping element 21 and the rotatable second clamping element 22 are shown partially pulled apart along the twine holder axis G. Here, it can be seen that the rotatable second clamping element 22 has a shank 36 with which the second clamping element 22 is rotatably mounted about the twine holder axis G in a bearing bore 37 of the first clamping element 21 and in a bearing bore of the knotter frame 11 not shown here.

In the embodiment shown, the clamping surfaces are cone-shaped. In another conceivable embodiment, the clamping surfaces can also be designed differently, for example as flat surfaces perpendicular to the twine holder axis G.

Figure 4:
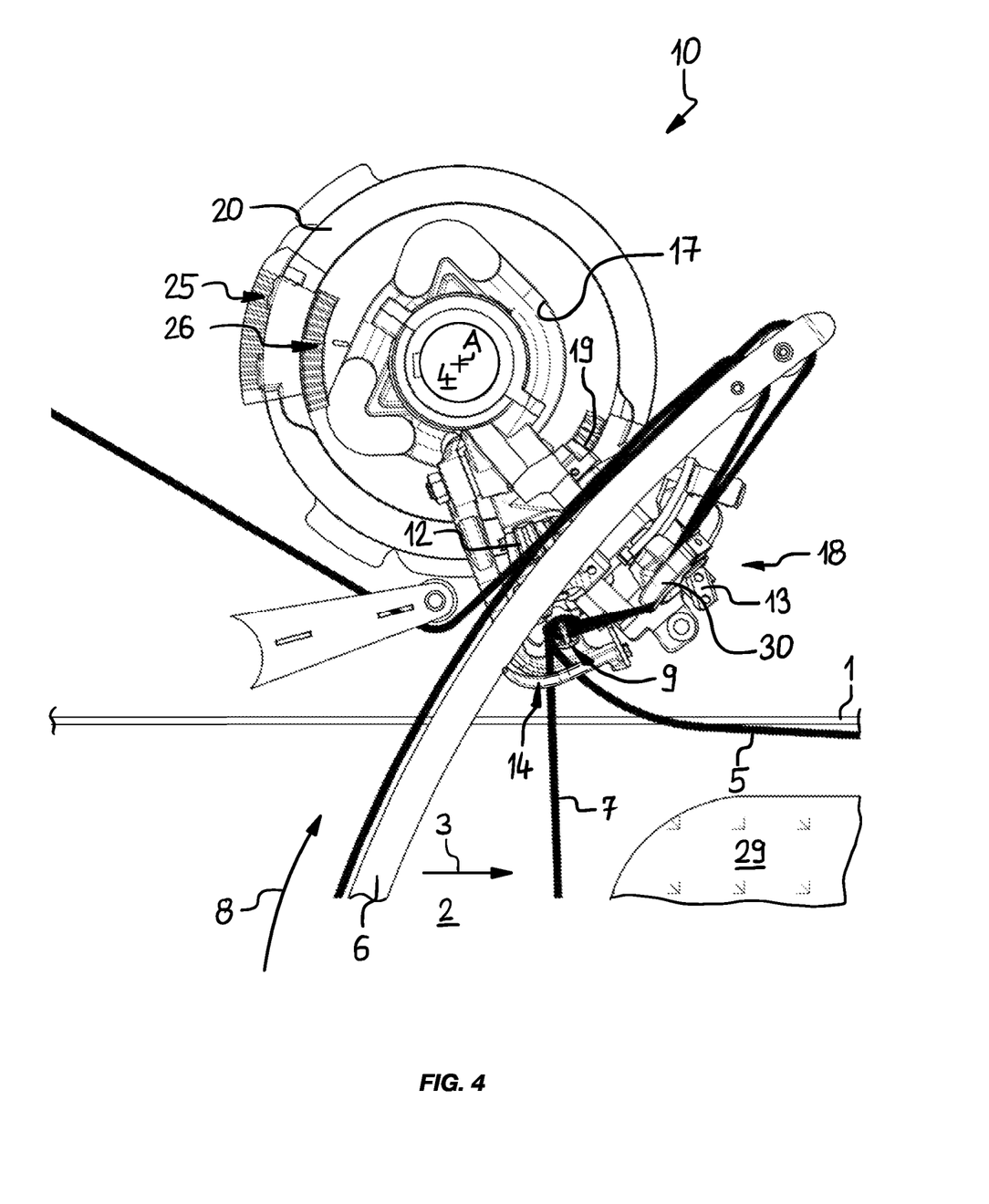
FIG. 4 shows the twine knotter according to FIG. 1 with the bill hook after a full rotation to form a loop for a first knot and the twine holding device in an intermediate position.

At this point, the bill hook 9 has been rotated back to its original position, as can be seen in FIG. 4. In the meantime, the bill hook tongue 28 was briefly raised by the hooked portion 27 so that the portion of the pair of twine strands 5, 7 located between the bill hook 9 and the twine holding device 18 was received in the bill hook jaw, the term bill hook jaw designating the region between the hooked portion 27 and the opened bill hook tongue 28 raised with respect to the hook member 27. In FIG. 4, the bill hook tongue 28 is again shown in its closed position with respect to the hooked portion 27, in which the pair of twine strands 5, 7 is clamped to the bill hook 9.

Figure 5:
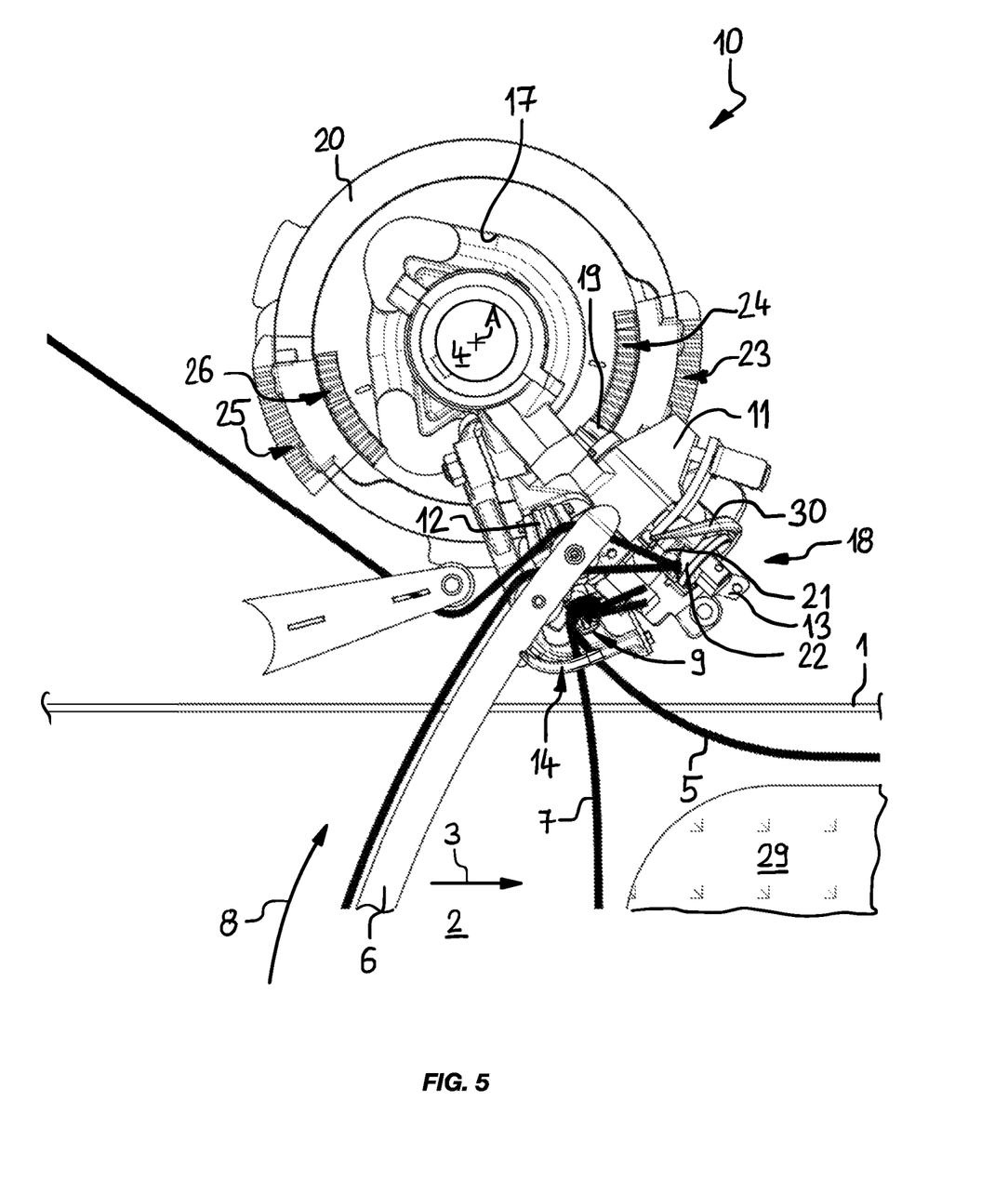
FIG. 5 shows the twine knotter according to FIG. 1 after the pair of twine strands has been cut between the bill hook and the twine holding device.

The bill hook 9 initially remains in this initial position, with the rotatable second clamping element 22 of the twine holding device 18 being further rotated so that the twine knife 13 attached to the rotatable second clamping element 22 cuts through the pair of twine strands 5, 7 between the bill hook 9 and the twine holding device 18 by the rotation of the rotatable second clamping element 22, as shown in FIG. 5. In this position, the rotatable second clamping element 22 is back in its original position with a first portion of the pair of twine strands 5, 7 clamped to the bill hook 9 and a second portion of the pair of twine strands 5, 7 clamped in the twine holding device 18.

The baler needle 6 now moves back to its initial position away from the twine knotter 10, leaving the section of the twine strand pair 5, 7 guided by the baler needle 6 clamped in the twine holding device 18.

Figure 6:
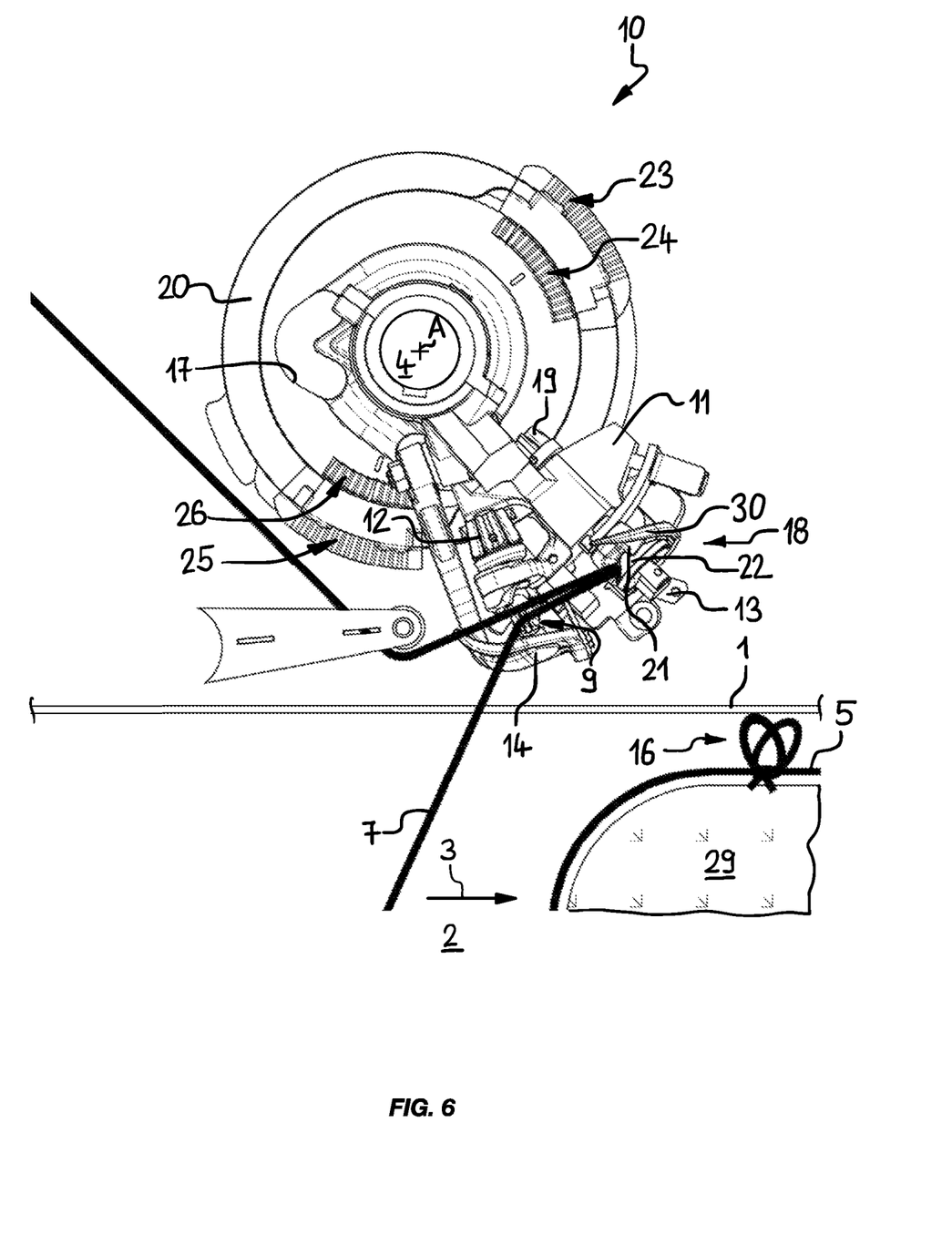
FIG. 6 shows the twine knotter according to FIG. 1 with the bill hook and the twine holding device in an initial position when the pair of twine strands, coming from the twine holding device, is fed again over the bill hook.

Subsequently, the knot pull-off arm 14 is pivoted in the direction in which the hooked portion 27 of the bill hook 9 is aligned, thereby pulling the loop on the bill hook 9 over the portion of the pair of twine strands 5, 7 clamped by the bill hook tongue 28, thereby forming a first knot 16.

Further movement of the baler needle 6 causes the section of the pair of twine strands 5, 7 clamped in the twine holding device 18 to be laid over the hooked portion 27 and the bill hook tongue 28 of the bill hook 9. The knot pull-off arm 14 is moved back to its original position.

Figure 7:
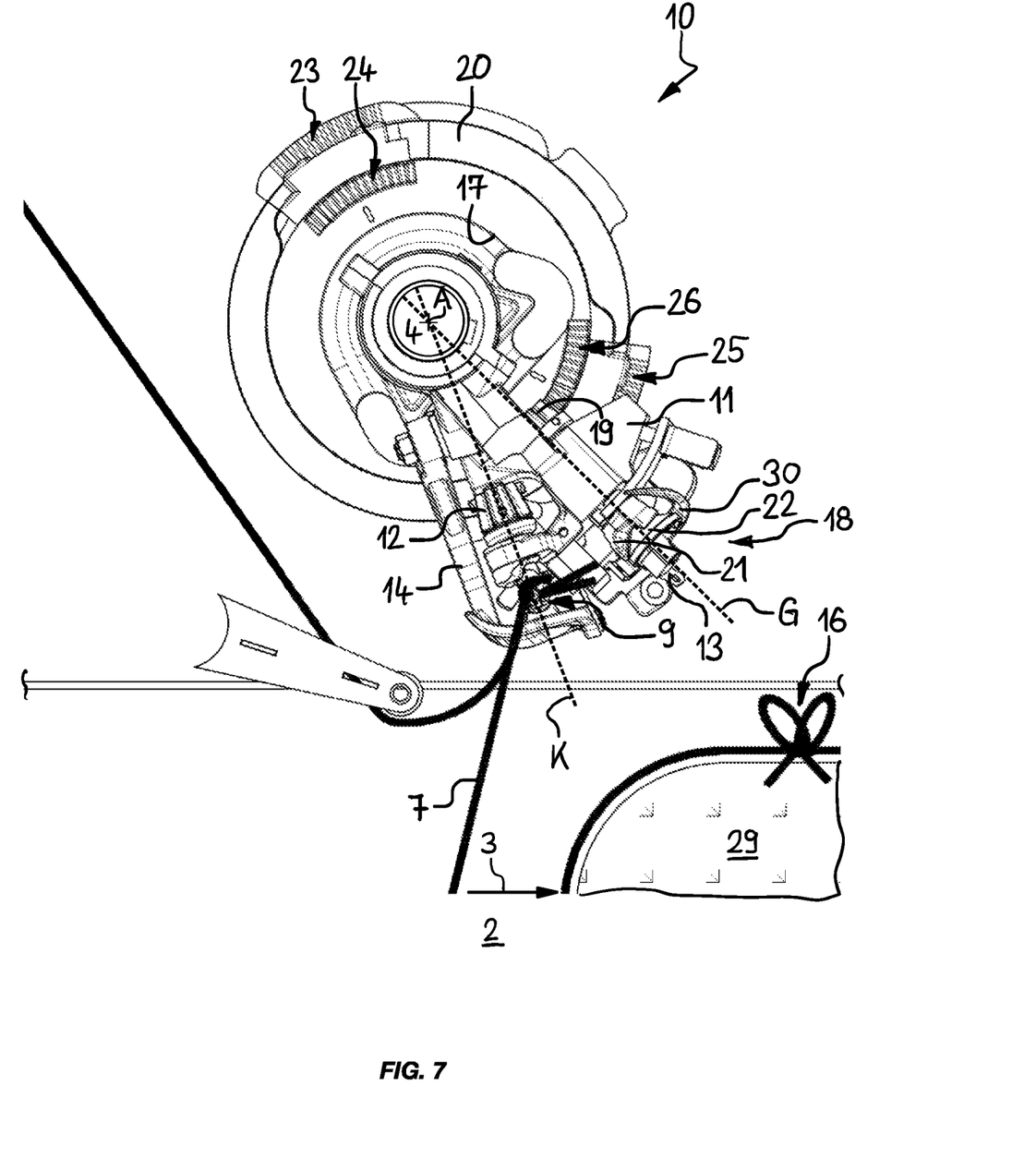
FIG. 7 shows the twine knotter according to FIG. 1 shortly before the second knot is pulled off.

Thereafter, as for forming the first knot 16, the bill hook 9 is rotated to form a second loop in the pair of twine strands 5, 7. After partial rotation of the bill hook 9 and at least partial formation of the second loop, the rotatable second clamping element 22 of the twine holding device 18 is again rotated until the pair of twine strands 5, 7 clamped between the hooked portion 27 and the bill hook tongue 28 is again released. This is done by the end of the pair of twine strands 5, 7 previously clamped in the twine holding device 18 being located in the radial recesses 31, 32 of the clamping elements 21, 22. This ensures that when the rotatable second clamping element 22 is rotated further, the twine knife 13 attached thereto can no longer cut the pair of twine strands 5, 7, but is forced out of the twine holding device 18 without cutting. Following this, the knot pull-off arm 14 again moves towards the hooked portion 27 to remove the second knot 33.

In an alternative embodiment, the twine knotter may be configured such that after feeding the pair of twine strands 5, 7, the twine holding device 18 is first driven without the bill hook 9 starting to rotate. Thus, the pair of twine strands 5, 7 is first clamped in the twine holding device 18 before clamping of the pair of twine strands 5, 7 to the bill hook 9 takes place. This can be accomplished by appropriately designing and positioning the toothing sections 23, 24, 25, 26 on the drive pulley 20.

In this embodiment, the twine knife 13 is not attached to the rotatable second clamping element 22 of the twine holding device 18, but is attached to the knot pull-off arm 14 so that the pair of twine strands 5, 7 are cut between the bill hook 9 and the twine holding device 18 during forward pivoting of the knot pull-off arm 14 to pull off the first knot 16. Before the twine knife 13 reaches the pair of twine strands 5, 7 when pivoting forward again after forming the loop for the second knot 33, the twine holding device 18 is transferred to a position in which the pair of twine strands 5, 7 is no longer clamped in the twine holding device 18. Thus, the twine knife 13 no longer cuts the pair of twine strands 5, 7, but merely pulls them out of the twine holding device 18 without cutting them.

Figure 10:
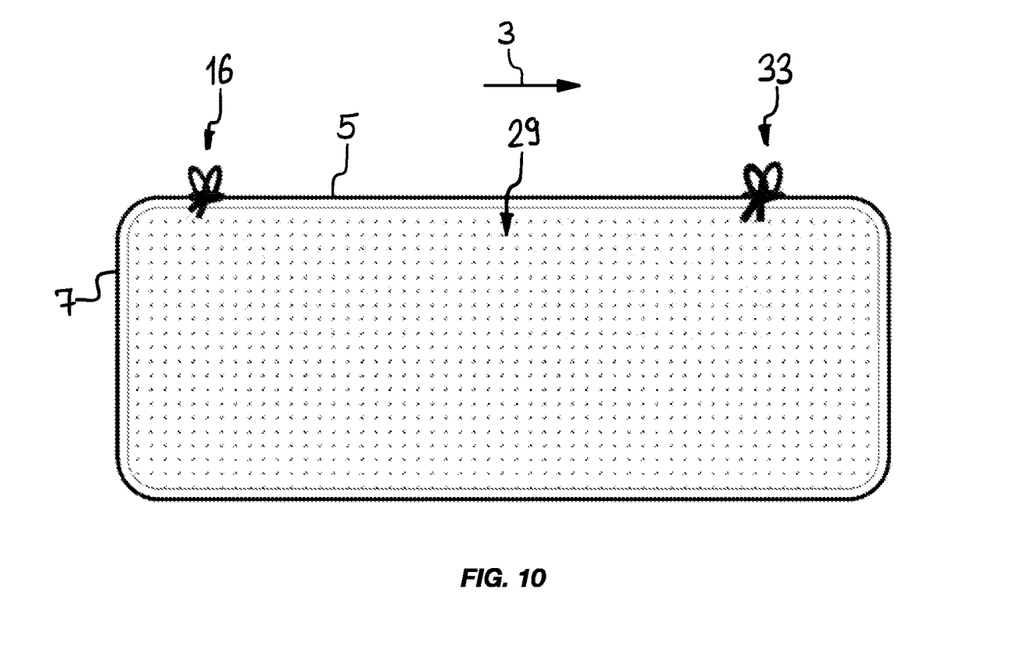
FIG. 10 shows a side view of a bale strapped with twine.

FIG. 10 shows a schematic side view of a bale 29 which is completely surrounded by twine strands 5, 7. During a knotting operation or a complete operation of the twine knotter, a first knot 16 is first knotted to complete the strapping of the bale 29. A second knot 33 is then tied in the same operation to form a loop into which another bale can be pressed.

LIST OF REFERENCE NUMBERS

1 Wall
2 Baling channel
3 Conveying direction
4 Knotter shaft
5 First twine strand
6 Baler needle
7 Second twine strand
8 Arrow
9 Bill hook
10 Twine knotter
11 Knotter frame
12 Pinion
13 Twine knife
14 Knot pull-off arm
15 Shaft journal
16 First knot
17 Groove
18 Twine holding device
19 Pinion
20 Drive pulley
21 First clamping element
22 Second clamping element
23 Toothing section
24 Toothing section
25 Toothing section
26 Toothing section
27 Hooked area
28 Bill hook tongue
29 Bale
30 Catching arm
31 Recess
32 Recess
33 Second knot
34 Clamping surface
35 Clamping surface
36 Shank
37 Bearing bore
38 Common toothing section
39 Common toothing section
A Drive axis
E Axis
G Twine holder axis
K Knotter axis

The invention claimed is:

1. A twine knotter for forming two knots in a pair of twine strands comprising:
a drive pulley driven intermittently rotatably about a drive axis,
a bill hook rotatably driven by the drive pulley about a knotter axis to form two successive knots in the pair of twine strands by two complete rotations of the bill hook in one rotation of the drive pulley,
a twine holding device for clamping the pair of twine strands between a first clamping element and a second clamping element of the twine holding device, the second clamping element being rotatably driven by the drive pulley, and
a twine knife for cutting the pair of twine strands,
wherein the rotatable second clamping element of the twine holding device is driven rotatably about a twine holder axis by the drive pulley in such a way that the rotatable second clamping element completes two rotations for one rotation of the drive pulley, and
wherein the twine holder axis and the knotter axis, viewed in the direction of the drive axis, enclose an angle of less than 45° with one another.

2. The twine knotter according to claim 1, wherein the twine holder axis and the knotter axis, viewed in the direction of the drive axis, enclose an angle of less than 40° with one another.

3. The twine knotter according to claim 1, wherein the twine holder axis and the knotter axis, viewed in the direction of the drive axis, enclose an angle of more than 15° with one another.

4. The twine knotter according to claim 1, wherein the twine holder axis intersects the drive axis or crosses the drive axis at a distance less than a largest outer diameter of the drive pulley.

5. The twine knotter according to claim 1, wherein the twine knotter further comprises a knot pull-off arm for pulling off a loop in the pair of twine strands and forming a knot after one full rotation of the bill hook.

6. The twine knotter according to claim 5, wherein a twine knife for severing the pair of twine strands is arranged on the knot pull-off arm.

7. The twine knotter according to claim 1, wherein a twine knife for severing the pair of twine strands is arranged on the rotatable second clamping element of the twine holding device.

8. The twine knotter according to claim 1, wherein the first clamping element is stationary and wherein the stationary first clamping element and the rotatable second clamping element of the twine holding device each have a recess, running radially with respect to the twine holder axis, for receiving the pair of twine strands.

9. The twine knotter according to claim 1, wherein the first clamping element and the rotatable second clamping element of the twine holding device each have mutually facing clamping surfaces for clamping the pair of twine strands, and wherein the clamping surfaces facing each other are conical and complementary to each other.

10. The twine knotter according to claim 1, wherein the drive pulley has two toothing sections for driving the second clamping element of the twine holding device and for driving the bill hook, respectively, which each extend partially in the circumferential direction about the drive axis.

11. A method of forming two knots in a twine by means of the twine knotter according to claim 1, the method comprising the following sequence of method steps:
feeding a pair of twine strands by means of a twine feeding device over the bill hook to the twine holding device,
rotating the bill hook one full turn about the knotter axis by rotating the drive pulley a half turn about a drive axis to form a first loop in the pair of twine strands for a first knot,
rotating said rotatable second clamping element one full turn about the twine holder axis by rotation of said drive pulley said half turn for clamping said pair of twine strands in said twine holding device, wherein said rotating of said rotatable second clamping element starts after at least partial rotation of said bill hook and at least partial formation of said first loop and wherein the twine holder axis and the knotter axis, viewed in the direction of the drive axis, enclose an angle of less than 45° with one another,
cutting the pair of twine strands between the bill hook and the twine holding device after the pair of twine strands has been clamped in the twine holding device,
pulling the first loop off the bill hook to form the first knot,
feeding the pair of twine strands by means of the twine feeding device (6) from the twine holding device over the bill hook,
rotating the bill hook one full turn to form a second loop in the pair of twine strands for a second knot,
rotating said rotatable second clamping element to release said pair of twine strands from said twine holding device, said rotating of said rotatable second clamping element starts after at least partial rotation of said bill hook and at least partial formation of said first loop, and
pulling the second loop off the bill hook to form the second knot.

12. The method according to claim 11, wherein the severing of the pair of twine strands is effected by further twisting of the rotatable second clamping element with a twine knife attached to the rotatable second clamping element.

13. The method according to claim 11, wherein the pulling off of a loop for forming one of the knots is effected by a knot pull-off arm.

14. The method according to claim 13, wherein the severing of the pair of twine strands is effected by means of a twine knife on the knot pull-off arm when a loop is pulled off the bill hook to form one of the knots.

15. The method according to claim 11,
wherein the first clamping element is stationary and
wherein the stationary first clamping element and the rotatable second clamping element of the twine holding device each have a recess, running radially with respect to the twine holder axis, for receiving the pair of twine strands,
wherein, in order to clamp the pair of twine strands after at least partial formation of the first loop, the rotatable second clamping element is rotated to a rotational position in which the recess of the rotatable second clamping element and the recess of the stationary first clamping element are oriented in overlapping relationship with one another,
wherein the pair of twine strands is then fed into the recesses of the two clamping elements, and
wherein finally the rotatable second clamping element is rotated further until the pair of twine strands is clamped between the clamping surfaces of the two clamping elements.

16. The method according to claim 11, wherein, after the pair of twine strands has been severed, the rotatable second clamping element continues to be rotated until the rotational position at the start of rotation is reached and the rotation is paused.

* * * * *